United States Patent
Verhaeghe et al.

(10) Patent No.: US 7,790,991 B2
(45) Date of Patent: Sep. 7, 2010

(54) CROP WEIGHING APPARATUS FOR AN AGRICULTURAL MACHINE

(75) Inventors: Didier O. M. Verhaeghe, Ipres (BE); Niklaas G. C. Monteyne, Blankenberge (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/134,067

(22) Filed: Jun. 5, 2008

(65) Prior Publication Data

US 2008/0302581 A1    Dec. 11, 2008

(30) Foreign Application Priority Data

Jun. 6, 2007    (GB) ................... 0710942.4

(51) Int. Cl.
*B65B 1/32* (2006.01)
*G01G 19/08* (2006.01)

(52) U.S. Cl. .................. 177/136; 100/99; 53/502; 177/145

(58) Field of Classification Search .......... 100/99; 177/136, 145; 53/502
See application file for complete search history.

(56) References Cited

U.S. PATENT DOCUMENTS

| | | | |
|---|---|---|---|
| 3,363,707 A | | 1/1968 | Murray |
| 5,209,313 A | * | 5/1993 | Brodrick et al. ............. 177/139 |
| 5,384,436 A | | 1/1995 | Pritchard |
| 5,742,010 A | | 4/1998 | Griffin |
| 5,753,865 A | * | 5/1998 | Lechtman ....................... 177/1 |
| 5,850,757 A | * | 12/1998 | Wierenga ..................... 73/296 |
| 5,959,257 A | | 9/1999 | Campbell |
| 6,066,809 A | * | 5/2000 | Campbell et al. ............. 177/16 |
| 6,259,167 B1 | * | 7/2001 | Norton ....................... 307/10.1 |
| 6,378,276 B1 | | 4/2002 | Dorge et al. |
| 6,457,295 B1 | | 10/2002 | Arnold |
| 7,064,282 B2 | | 6/2006 | Viaud et al. |
| 7,514,640 B2 | * | 4/2009 | De Rycke et al. ........... 177/153 |
| 7,584,696 B2 | * | 9/2009 | Verhaeghe et al. ...... 100/188 R |
| 2004/0089483 A1 | * | 5/2004 | Viaud et al. .................. 177/136 |
| 2007/0278019 A1 | * | 12/2007 | Santi et al. ................... 177/136 |
| 2008/0141870 A1 | * | 6/2008 | Verhaeghe et al. ............. 100/7 |
| 2008/0142278 A1 | * | 6/2008 | De Rycke et al. ........... 177/153 |

FOREIGN PATENT DOCUMENTS

| | | |
|---|---|---|
| DE | 8908567 | 5/1989 |
| EP | 0990879 | 5/2000 |
| JP | 57189022 | 11/1982 |

* cited by examiner

*Primary Examiner*—Randy W Gibson
(74) *Attorney, Agent, or Firm*—Patrick M. Sheldrake; John William Stader; Michael G. Harms

(57) ABSTRACT

A weighing apparatus for bales as they are released from the bale chute of an agricultural baler has a weighting table supported on a first side of a support frame by a single load beam and supported on a second side by a support element. The weighing apparatus has a mechanism for measuring the inclination of the weighing table relative to the horizontal as well as a load beam and processor. The processor receives the signal from the load beam and based upon the sensed inclination provide an indication of a weight supported by the weighing table.

13 Claims, 2 Drawing Sheets

CROP WEIGHING APPARATUS FOR AN AGRICULTURAL MACHINE

FIELD OF THE INVENTION

The present invention relates to a weighing apparatus for weighing bales as they are discharged from the bale chute of an agricultural baler.

BACKGROUND OF THE INVENTION

Weighing apparatuses have previously been proposed comprising a weighing table secured to a support frame by way of load beams which produce electrical output signals indicative of the weight resting on the weighing table. In U.S. patent application Ser. No. 11/941,620, a weighing apparatus is built into a bale chute of an agricultural baler to weigh bales before they are discharged.

Two or more load beams have been previously used to support the weighing table on the support frame so that the downward force is measured at each point of support. The forces measured by the different load beams were then summed to indicate the total weight acting down on the weighing table. A weighing apparatus using two load beams, arranged one on each side of the bale chute and often duplicate electronic processing circuitry is often quite costly to manufacture. A less expensive weighing apparatus using fewer components would therefore be desirable.

SUMMARY OF THE INVENTION

With a view to enabling the cost of the weighing apparatus to be reduced still further, the present invention provides a weighing apparatus for weighing bales on the bale chute of a square baler, which weighing apparatus comprises a weighing table supported on one side of a support frame by means of a single load beam, means supporting the other side of the weighing table on the support frame, means for measuring the inclination of the weighing table relative to the horizontal and circuitry for processing the output signal of the single load beam in dependence upon the sensed inclination to provide an indication of the weight supported by the weighing table.

The invention takes advantage of the fact that as a square bale travels along a bale chute, it is always centered on the weighing table. Assuming therefore that its center of gravity lies directly above the mid-point between the load beam on one side and the pivot on the other, the force measured by the load beam will be precisely one half of the weight of the bale. However, such an assumption cannot be made if the weighing table is not horizontal because the center of gravity of the bale is higher than the imaginary plane passing through the load beam on one side and the pivot axis on the other.

The invention overcomes this problem by measuring the inclination of the weighing table. As the through section of a bale produced by a square baler is fixed, there is a fixed relationship between the line of action of the weight of the bale and inclination of the weighing table and the inclination measurement thereby enables the weight measurement to be compensated for the inclination of the ground.

As the cost of an inclinometer is less than that of a load beam, the invention provides a significant cost saving.

When the bale is not centrally positioned when coming out of the baling chamber, e.g. when the machine is driving on a hillside, one may provide means, such as deflector plates, in the bale chute to center the bale, forcing the bale to be positioned in the correct weighing position.

The correction applied to the weight signal derived from the load beam may either be generated within the signal processor by a suitable algorithm or it may be derived from a look-up table stored in a memory.

In the case that the baler is driven over the swath in such a manner that the picked up material is not uniformly placed in the baling chamber, the weight distribution in the through section of the bale is not uniform and will result in a bale which is not perfectly square when coming out of the baling chamber. Weighing with one load beam will result in a wrong measurement.

This may be overcome in an embodiment of the invention by using the left-right indication signal that is used by the driver of the tractor to center the header over the swath. Such a left-right indication signal may for example be generated by analyzing the output signal of an optical sensing device, such as a laser scanner, monitoring the ground ahead of the tractor. If the left-right indicator detects that the tractor is not positioned precisely in the middle of the swath, it will warn the driver to drive more to the left or to the right, as the case may be. However, this signal can also be used as a compensation signal for the weighing measurement of the bale.

BRIEF DESCRIPTION OF THE DRAWINGS

The invention will now be described further, by way of example, with reference to the accompanying drawings, in which.

DESCRIPTION OF THE PREFERRED EMBODIMENT(S)

Figure 1:
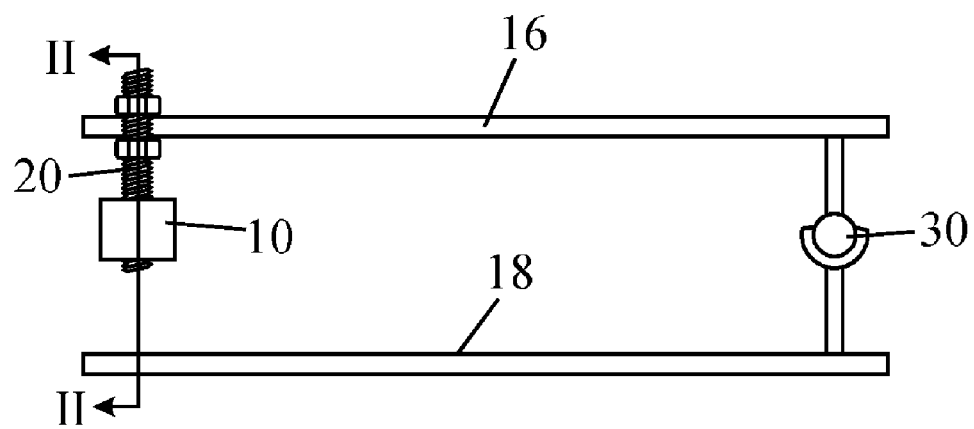
FIG. 1 is a schematic section through a weighing apparatus of the invention taken along the line I-I in FIG. 2.
Figure 2:
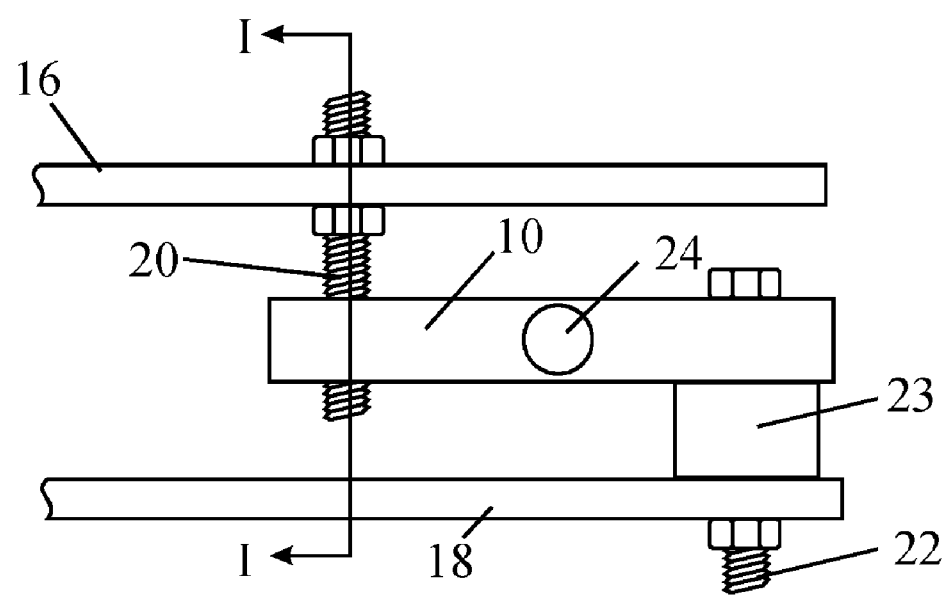
FIG. 2 is a schematic section through the same weighing apparatus taken along the line II-II in FIG. 1.

FIG. 1 and FIG. 2 show a weighing apparatus to be incorporated in the bale chute of a square baler. The apparatus comprises a weighing table 16 and a support frame 18. On one side of the bale chute, the weighing table 16 is supported by means of a free pivot, such as the illustrated ball joint 30, allowing pivoting movement about an axis normal to the plane of FIG. 1 and about an axis normal to the plane of FIG. 2, though it need only allow pivoting movement about the axis normal to the plane of FIG. 1.

When allowing pivoting movement about two axes, a single load beam 10 will need to take up the entire moment. Alternatively, the ball joint 30 can be replaced by a bearing allowing only pivoting movement about the axis normal to the plane of FIG. 1. This will prevent the entire moment being transmitted to the single load beam 10, but will divide the moment between the load beam 10 and the bearing.

As a further possibility, a metal beam having the same dimensions and properties as the load beam itself can be used to replace the ball joint 30. When using the metal beam, the same situation is created as using two load beams, however without weighing capacity in the metal beam. The measured results of the one load beam 10 then need to be compensated by software to eliminate possible errors.

On the other side of the bale chute, the weighing table is supported by the load beam 10, more clearly shown in FIG. 2. The load beam 10 comprises an elongated rectangular bar with connection holes at each end and a sensing element between the two connection points such as a load sensor 24 in the middle. The load beam is connected at one end by a bolt 20 to the weighing table 16 and at its other end by bolts 22 and an intermediate piece 23 to the support frame 18.

Figure 3:
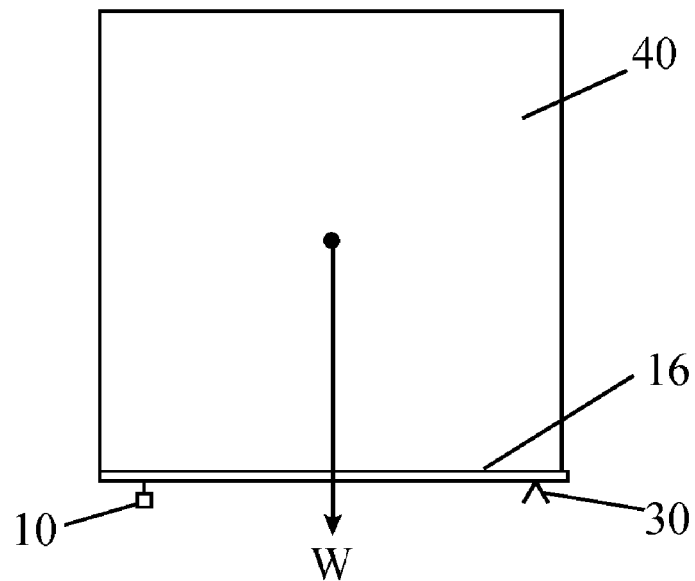
FIG. 3 and FIG. 4 are force diagrams showing the effect of inclining the weighing table on the force acting down on the load beam.

FIG. 3 is a diagram showing a bale 40 passing over the weighing table 16 while the latter is horizontal. The center of gravity of the bale 40 is centered on the weighing table between the pivot 30 on one side and the load beam 10 on the other and the line of action of its weight, represented by an arrow, is equidistant from the pivot 30 and the load beam 10. In this case, the weight W of the bale will be shared equally between the load beam 10 and the pivot 30 and the force sensed by the load beam will be W/2, i.e. one half of the weight of the bale 40.

It is important for the bale to be placed symmetrically on the weighing table. When the bale is not centrally positioned when coming out of the baling chamber, means such as deflector plates are foreseen to center the bale to allow the bale to be positioned in the correct weighing position.

Figure 4:
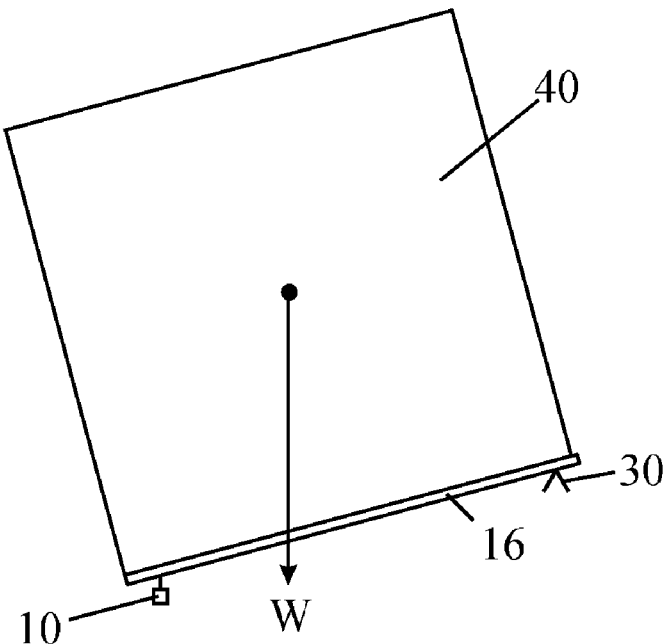

One cannot make the assumption that the weight of the bale 40 will always be shared equally between the pivot 30 and the load beam 10. FIG. 4 shows the effect of inclining the weighing table 16. The line of action of the weight now lies closer to the load beam 10 than to the pivot 30 and the force sensed by the load beam will therefore be more than W/2. Conversely, if the weighing table 16 is inclined in the opposite direction, the force sensed by the load beam 10 will be less than W/2.

Because the cross-sectional dimensions of the bales are constant, being determined by the size of the baling chamber, there is a simple mathematical relationship between the inclination and the fraction of the weight of the bale supported by the load beam 10. As the moments about the pivot point 30 of the force exerted by the weight of the bale and the reaction force at the load beam must balance exactly, the reaction force at the load beam is a function of the angle of inclination, the size of the bale, and the distance between the load beam 10 and the pivot point 30. As the section of the bales and the width of the weighing table are known constants, the fraction of the full weight of the bale sensed by the load beam will vary with the angle of inclination only.

In the present invention, a transducer (not shown) is provided to indicate the angle of inclination of the weighing table 16 relative to the horizontal and its output is applied to an electronic circuit analyzing the output signal of the sensor 24 of the load beam 10.

From simple geometry and applied mathematics, one can set out an equation giving a correction factor to be applied to the force sensed by the load beam 10 in order to indicate the weight of the bale. The correction factor can therefore readily be computed by the electronic circuit. To increase the speed of analysis, it is alternatively possible to store correction factors in a table from which they are looked up in dependence upon the sensed inclination of the weighing table.

If the baler is driven over the swath in such a manner that the picked up material is not uniformly pushed in the baling chamber, the weight distribution in the through section of the bale is not uniform and will result in a bale having a section which is not perfectly square when coming out of the baling chamber. Weighing with one load beam will result in a wrong measurement if no compensation for this error is made.

A correction signal can be obtained by using the left-right indication that is often used to guide the driver of the tractor along the swath. If the left-right indicator detects that the tractor is not positioned precisely in the middle of the swath, it will warn the driver to drive more to the left or to the right, depending on the case. This signal can be used as a correction signal for the weighing measurement of the bale.

Having thus described the invention, what is claimed is:

1. A weighing apparatus for weighing bales on a bale chute of a square baler, the weighing apparatus comprising:
    a weighing table having a width, oriented generally normal to a direction of bale movement across the bale chute, supported on a first side of a support frame by a single load beam and supported on a second side by a support element having two or fewer degrees of freedom; and
    a mechanism for measuring an inclination of said weighing table relative to the horizontal and circuitry configured to process an output signal of the single load beam based upon the sensed inclination, dimensions and center of gravity of the bale and the relation of the center of gravity to at least one side support to provide an indication of a weight supported by said weighing table.

2. The weighing apparatus of claim 1, wherein the circuitry is further configured to compute a correction factor to be applied to the force sensed by the load beam based upon the measured inclination of the weighing table; the correction factor representative of a percentage of the weight of the bale applied to the load beam.

3. The weighing apparatus of claim 1, wherein the circuitry is further configured to read a correction factor from a look-up table and the correction factor is applied to the force sensed in the load beam based on the measured inclination of the weighing table.

4. The weighing apparatus of claim 1, wherein the circuitry is further configured to receive a correction signal obtained from a left-right indicator of the baler to compensate for errors in the through section of a bale;
    the left-right indicator configured to compare the path of the baler with a swath path and indicates a direction of the middle of the swath with respect to the path of the baler; and
    the circuitry configured to determine a bale weight correction factor as a function of the distance between the path of the baler and the center of the swath and apply the bale weight correction factor to the force sensed by the load beam.

5. The weighing apparatus of claim 1, further comprising deflector plates arranged to move the center of gravity of the bale to a weighing position when leaving the baling chamber.

6. The weighing apparatus of claim 1, wherein the supporting element is a ball joint.

7. The weighing apparatus of claim 1, wherein the supporting element is a bearing.

8. The weighing apparatus of claim 1, wherein the supporting element is a metal beam having the same dimensions and properties as the load beam.

9. The weighing apparatus of claim 1, wherein the load beam is connected at one to the weighing table at the other end to the support frame and has a load sensor located in between the two ends.

10. The weighing apparatus of claim 9, wherein the load beam comprises an elongated rectangular bar with connection holes at each end and the load sensor is located between the two connection holes, wherein the load beam is connected at one end by a bolt to the weighing table and at its other end through a bolt to the support frame.

11. The weighing apparatus of claim 1, in combination with a square baler, wherein the weighing device is connected to the bale chute of the square baler.

12. A square baler comprising:
    a bale chute having a weighing table, the weighing table having a width, oriented generally normal to a direction of bale movement of the chute, supported on a first side of a support frame by a single load beam and supported on a second side by a support element having two or fewer degrees of freedom; and a mechanism for measuring an inclination of said weighing table relative to the horizontal and circuitry configured to process an output signal of the single load beam based upon the sensed inclination, dimensions and center of gravity of the bale and the relation of the center of gravity to at least one side support to provide an indication of a weight supported by said weighing table.

13. The baler of claim 9, further comprising a left-right indicator configured to compare a desired swath path with respect to a current path of the baler and indicate the location of the swath with respect to the path of the baler; and the circuitry configured to determine a bale weight correction factor as a function of a difference between the path of the baler and the swath path, wherein the correction factor is applied to the indication of weight supported by the table.

* * * * *